United States Patent
Shen

(10) Patent No.: US 10,698,529 B2
(45) Date of Patent: Jun. 30, 2020

(54) INTEGRATING CAPACITIVE SENSING WITH AN OPTICAL SENSOR

(71) Applicant: FINGERPRINT CARDS AB, Gothenburg (SE)

(72) Inventor: Guozhong Shen, San Jose, CA (US)

(73) Assignee: FINGERPRINT CARDS AB, Gothenburg (SE)

( * ) Notice: Subject to any disclaimer, the term of this patent is extended or adjusted under 35 U.S.C. 154(b) by 0 days.

(21) Appl. No.: 16/217,037

(22) Filed: Dec. 11, 2018

(65) Prior Publication Data
US 2019/0114030 A1   Apr. 18, 2019

Related U.S. Application Data

(63) Continuation of application No. 15/696,141, filed on Sep. 5, 2017, now Pat. No. 10,162,462.

(60) Provisional application No. 62/492,719, filed on May 1, 2017.

(51) Int. Cl.
| | | |
|---|---|---|
| G06F 3/041 | (2006.01) | |
| G06F 3/044 | (2006.01) | |
| G06K 9/00 | (2006.01) | |
| G06F 3/042 | (2006.01) | |

(52) U.S. Cl.
CPC ............ *G06F 3/0416* (2013.01); *G06F 3/044* (2013.01); *G06F 3/0421* (2013.01); *G06K 9/0002* (2013.01); *G06K 9/0004* (2013.01); *G06F 2203/04106* (2013.01); *G06K 9/0008* (2013.01)

(58) Field of Classification Search
CPC ...... G06F 3/0416; G06F 3/0421; G06F 3/044; G06F 2203/04106; G06K 9/0002; G06K 9/0004; G06K 9/0008
See application file for complete search history.

(56) References Cited

U.S. PATENT DOCUMENTS

| | | | |
|---|---|---|---|
| 5,483,263 A * | 1/1996 | Bird | ................... G02F 1/13338 345/207 |
| 5,721,422 A | 2/1998 | Bird | |
| 5,991,467 A | 11/1999 | Kamiko | |
| 6,031,217 A * | 2/2000 | Aswell | ................ H04N 5/3692 250/208.1 |
| 6,396,046 B1 | 5/2002 | Possin et al. | |
| 6,501,846 B1 | 12/2002 | Dickinson et al. | |

(Continued)

FOREIGN PATENT DOCUMENTS

| | | |
|---|---|---|
| JP | 2009-287993 A | 12/2009 |
| JP | 2013-058117 A | 3/2013 |

(Continued)

OTHER PUBLICATIONS

U.S. Appl. No. 15/415,507, "Hybrid Optical and Capacitive Sensor" filed Jan. 25, 2017.

(Continued)

*Primary Examiner* — Jose R Soto Lopez
(74) *Attorney, Agent, or Firm* — RMCK Law Group, PLC

(57) ABSTRACT

Embodiments herein provide a dual optical and capacitance sensor. During a first time period, the dual sensor uses optical sensing to capture a fingerprint (e.g., to identify or verify the fingerprint). During a second time period, the dual sensor uses one or more capacitive sensor electrodes to perform capacitive sensing. The capacitive sensing may be absolute capacitive sensing or transcapacitive sensing.

20 Claims, 12 Drawing Sheets

(56) References Cited

U.S. PATENT DOCUMENTS

| | | | |
|---|---|---|---|
| 7,831,070 B1 | 11/2010 | Cheng et al. | |
| 8,643,594 B2* | 2/2014 | Sato | G06F 3/0412 345/104 |
| 9,103,658 B2* | 8/2015 | Mu | G06F 3/0421 |
| 9,632,344 B2* | 4/2017 | Ludwig | G06F 3/0412 |
| 9,710,087 B1* | 7/2017 | Jayaraj | G02B 6/0036 |
| 9,864,469 B2* | 1/2018 | Cho | G06F 3/0421 |
| 9,891,756 B2* | 2/2018 | Cho | G06F 3/0416 |
| 2002/0000915 A1 | 1/2002 | Lee et al. | |
| 2004/0252867 A1 | 12/2004 | Lan et al. | |
| 2009/0166411 A1 | 7/2009 | Kramer et al. | |
| 2009/0244026 A1* | 10/2009 | Purdy | G06F 3/042 345/174 |
| 2011/0311232 A1* | 12/2011 | Morita | H04B 10/6973 398/141 |
| 2012/0071149 A1 | 3/2012 | Bandyopadhyay et al. | |
| 2013/0314365 A1* | 11/2013 | Woolley | H03K 17/941 345/174 |
| 2014/0085267 A1* | 3/2014 | Ahn | G06F 3/0412 345/175 |
| 2014/0092052 A1* | 4/2014 | Grunthaner | G06F 3/044 345/174 |
| 2014/0098058 A1* | 4/2014 | Baharav | G06F 3/0421 345/174 |
| 2014/0213323 A1* | 7/2014 | Holenarsipur | H03K 17/955 455/566 |
| 2016/0092717 A1 | 3/2016 | Ling | |
| 2016/0132176 A1* | 5/2016 | Bae | G06F 3/0416 345/174 |
| 2016/0132712 A1* | 5/2016 | Yang | G06K 9/0002 348/77 |
| 2016/0148036 A1* | 5/2016 | Kim | G06K 9/0002 382/124 |
| 2016/0246396 A1* | 8/2016 | Dickinson | G06K 9/209 |
| 2016/0247010 A1 | 8/2016 | Huang et al. | |
| 2016/0314334 A1* | 10/2016 | He | G06K 9/0004 |
| 2017/0097702 A1* | 4/2017 | Chang | G06F 3/044 |
| 2017/0124370 A1* | 5/2017 | He | G06K 9/0012 |
| 2017/0220838 A1* | 8/2017 | He | G06F 3/0418 |
| 2017/0220842 A1* | 8/2017 | Thompson | G06F 1/3215 |
| 2017/0270342 A1* | 9/2017 | He | G06F 3/042 |
| 2017/0285789 A1* | 10/2017 | Barel | G06F 3/0412 |
| 2017/0293791 A1* | 10/2017 | Mainguet | G06K 9/0002 |
| 2017/0316248 A1* | 11/2017 | He | G06K 9/00006 |
| 2017/0322673 A1* | 11/2017 | Ballan | G06F 3/042 |
| 2018/0005005 A1* | 1/2018 | He | G06F 21/83 |
| 2018/0018035 A1* | 1/2018 | Kurokawa | H01L 27/14609 |
| 2018/0046281 A1* | 2/2018 | Pi | A61B 5/02416 |
| 2018/0082100 A1* | 3/2018 | Hsieh | G06K 9/2009 |
| 2018/0089491 A1* | 3/2018 | Kim | G06F 3/0412 |
| 2018/0129319 A1* | 5/2018 | Hekmatshoartabari | G06K 9/0002 |
| 2018/0129798 A1* | 5/2018 | He | G06K 9/0002 |
| 2018/0137325 A1* | 5/2018 | Mainguet | G06K 9/0002 |
| 2018/0211078 A1 | 7/2018 | Lillie et al. | |
| 2018/0260602 A1* | 9/2018 | He | G06K 9/0008 |
| 2019/0050621 A1* | 2/2019 | Xu | G06F 21/32 |

FOREIGN PATENT DOCUMENTS

| | | |
|---|---|---|
| KR | 2009-0121635 A | 11/2009 |
| KR | 2013-0006295 A | 1/2013 |
| KR | 10-1376228 B1 | 4/2014 |
| WO | WO-2017045130 A1 | 3/2017 |

OTHER PUBLICATIONS

PCT Application No. PCT/US2018/017982, International Search Report and Written Opinion dated May 24, 2018, consists of 9 pages.

PCT Application No. PCT/US2018/017982, International Report On Patentability dated Nov. 14, 2019, consists of 6 pages.

* cited by examiner

US 10,698,529 B2

INTEGRATING CAPACITIVE SENSING WITH AN OPTICAL SENSOR

CROSS-REFERENCE TO RELATED APPLICATIONS

This application is a continuation of U.S. patent application Ser. No. 15/696,141, filed Sep. 5, 2017 entitled "Integrating Capacitive Sensing With An Optical Sensor" which claims priority to U.S. Provisional Patent Application Ser. No. 62/492,719, entitled "Integrating Capacitive Sensing With An Optical Sensor" filed May 1, 2017 which are incorporated by reference herein in their entireties.

FIELD OF THE INVENTION

This invention generally relates to electronic devices and integrating capacitive sensing with an optical fingerprint sensor.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. In one example, the sensing region includes sensor electrodes used to measure changes in capacitance resulting from an input object (e.g., a finger or stylus) interacting with the sensing region. In addition, the input device may include a fingerprint sensor that uses optical sensing to detect ridges and valleys in a finger. However, optical sensing can require significant amounts of power when doing some functions such as detecting the presence of a finger when the input device is in a low-power mode.

BRIEF SUMMARY OF THE INVENTION

One embodiment described herein is an input device that includes a dual optical and capacitance sensor that includes a photosensor, a switch electrically coupled between the photosensor and a data line, and a capacitive sensing layer, the capacitive sensing layer comprising at least one sensor electrode electrically coupled to the photosensor. The input device also includes a processing system configured to drive a constant voltage on the sensor electrode when performing optical sensing.

Another embodiment described herein is processing system that includes a sensor circuit configured to drive a constant voltage on a sensor electrode when performing optical sensing, wherein the sensor electrode is electrically coupled to a photosensor whose output is measured when performing optical sensing and drive an AC signal on the sensor electrode when performing capacitive sensing. Moreover, the sensor circuit comprises an analog front end configured to detect an input object using the AC signal when performing capacitive sensing Another embodiment described herein is a method that includes driving a constant voltage on a sensor electrode when performing optical sensing where the sensor electrode is electrically coupled to a photosensor. The method also includes measuring a fingerprint when performing optical sensing using the photosensor and driving an AC signal on the sensor electrode when performing capacitive sensing.

BRIEF DESCRIPTION OF DRAWINGS

So that the manner in which the above recited features of the present invention can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
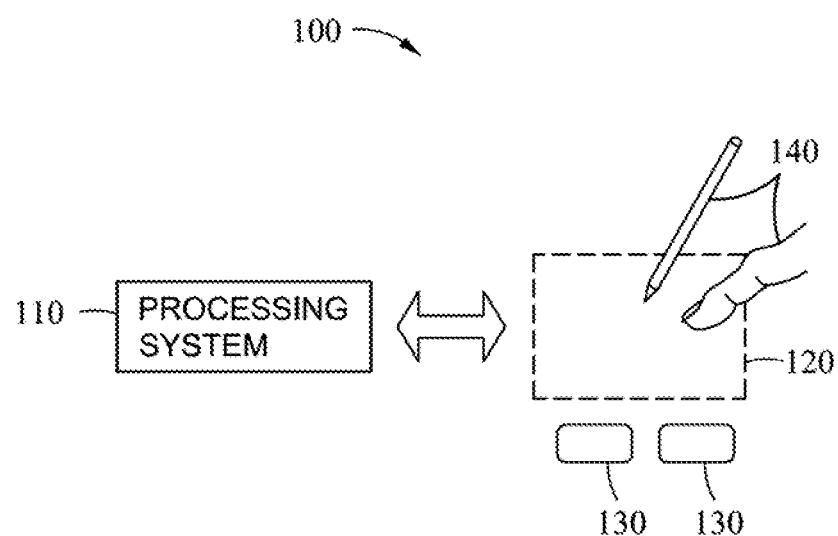
FIG. 1 is a block diagram of an exemplary system that includes an input device in accordance with an embodiment of this disclosure.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability. In one embodiment, the input device includes an optical fingerprint sensor that can perform capacitive sensing (e.g., a dual optical and capacitance sensor). That is, during a first time period, the fingerprint sensor uses optical sensing to capture a fingerprint (e.g., to identify or verify the fingerprint). During a second time period, the fingerprint sensor uses one or more capacitive sensor electrodes to perform capacitive sensing. The capacitive sensing may be absolute capacitive sensing or transcapacitive sensing.

In one embodiment, the fingerprint sensor includes a presence detection mode where capacitive sensing is performed to detect when an input object (e.g., a finger or stylus) is proximate to the fingerprint sensor. The presence detection mode may be performed when the input device is in a low-power state. For example, the fingerprint sensor can use the presence detection mode to determine when to wake up the input device from the low-power state. The fingerprint sensor can then switch the input device to a higher-power state and use optical sensing in order to capture a fingerprint. Advantageously, using capacitive sensing during the low-power state may save power relative to using optical sensing to determine when an input object is proximate to the fingerprint sensor.

In another embodiment, the fingerprint sensor includes a navigation mode that uses one or more capacitive sensor electrodes arranged in the sensor to detect movement of the input object—e.g., a tap, double tap, swipe, etc. In this manner, the optical fingerprint sensor can be used as a navigation button or area that uses capacitive sensing for controlling the input device. For example, when in the navigation mode, the fingerprint sensor can move cursor, switch between applications or pages outputted in a display, open an application, activate a displayed button or feature, and the like.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1. In one embodiment, the input device 100 is a fingerprint sensor that senses the different features in a finger such as ridges and valleys which can be used to form a fingerprint. The fingerprint sensor may be a swipe sensor, where a fingerprint image is reconstructed from a series of scans as the user moves their finger over the sensor, or a placement sensor, where a sufficient area of the fingerprint can be captured from a single scan as the user holds her finger at a fixed location in the sensing region 120.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100. In another embodiment, the sensing region 120 has a circular shape that conforms to the shape of a fingertip.

The input device 100 may utilize any combination of sensor components and sensing technologies to detect user input in the sensing region 120. The input device 100 comprises one or more sensing elements for detecting user input.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In some optical implementations of the input device 100, one or more optical detector elements (or "sensing elements") are included for imaging an input object or detecting user input. The detector element(s) detect light from the sensing region. In various embodiments, the detected light may be reflected from input objects in the sensing region, emitted by input objects in the sensing region, transmitted through input objects in the sensing region, or some combination thereof. Example optical detector elements include photodiodes, phototransistors, and other types of photosensors configured to detect light in the visible or invisible spectrum (such as infrared or ultraviolet light).

Some optical implementations utilize a light source (e.g., one or more LEDs) to provide illumination to the sensing region. Light reflected or scattered from the sensing region in the illumination wavelength(s) can be detected to determine input information corresponding to the input object.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system comprises both optical detection circuitry and capacitive detection circuitry.

In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes (e.g., unlocking the user device or providing access to secure data using a detected fingerprint), as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the sensing region 120 overlaps at least part of an active area of a display screen. For example, the input device 100 may comprise substantially transparent sensor electrodes overlaying the display screen and provide a touch screen interface for the associated electronic system. As another example, the input device may comprise photosensors in or under the display screen and provide an optical sensing interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
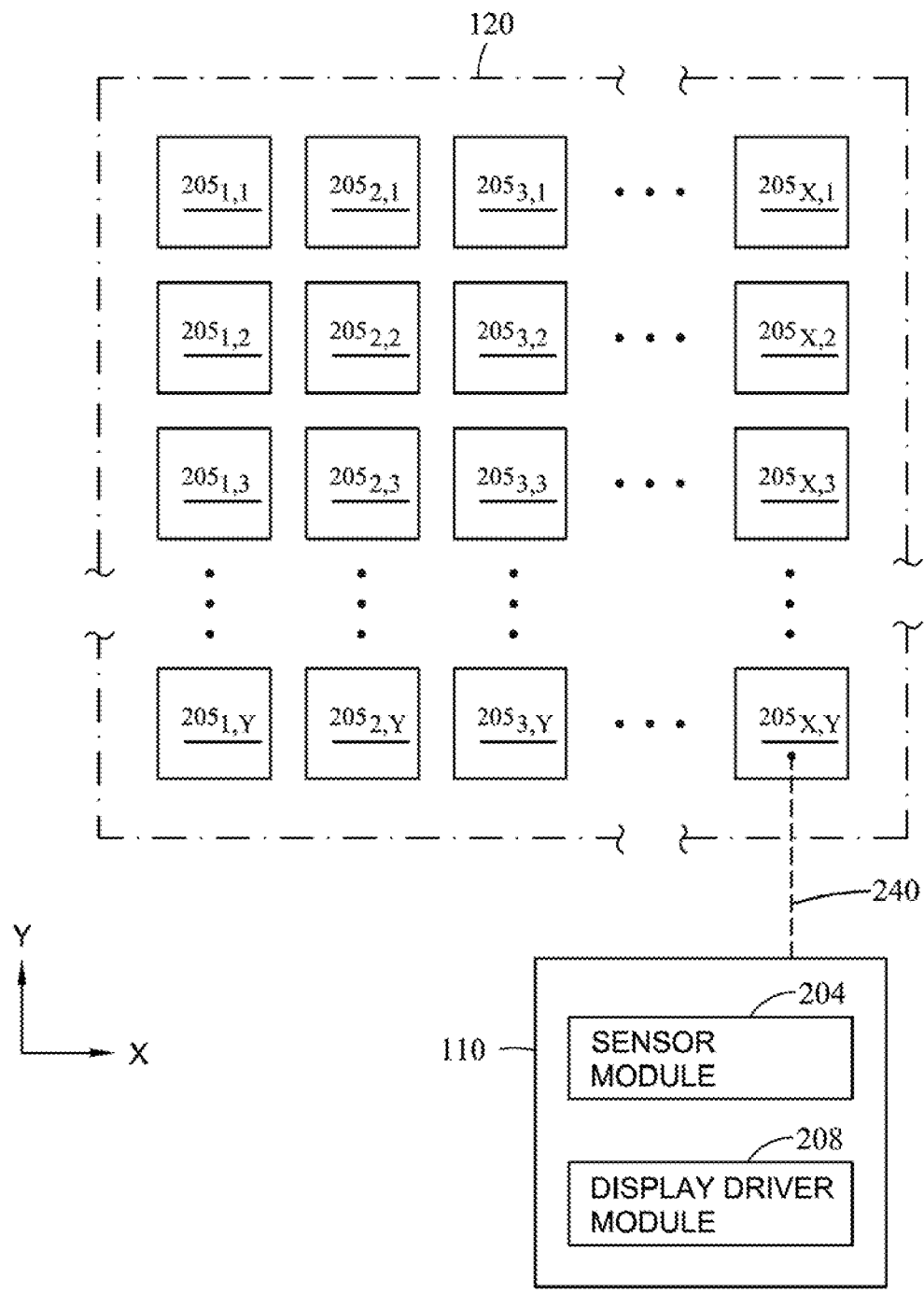
FIG. 2 shows a portion of an exemplary pattern of capacitive sensing pixels, in accordance with an embodiment described herein.

FIG. 2 shows a portion of an exemplary pattern of capacitive sensing pixels 205 (also referred to herein as capacitive pixels or sensing pixels) configured to sense in the sensing region 120 associated with a pattern, according to some embodiments. Each capacitive pixel 205 may include one of more of the sensing elements described above. For clarity of illustration and description, FIG. 2 presents the regions of the capacitive pixels 205 in a pattern of simple rectangles and does not show various other components within the capacitive pixels 205. In one embodiment, the capacitive sensing pixels 205 are areas of localized capacitance (capacitive coupling). Capacitive pixels 205 may be formed between an individual sensor electrode and ground in a first mode of operation and between groups of sensor electrodes used as transmitter and receiver electrodes in a second mode of operation. The capacitive coupling changes with the proximity and motion of input objects in the sensing region 120 associated with the capacitive pixels 205, and thus may be used as an indicator of the presence of the input object in the sensing region 120 of the input device or to detect ridges and valleys when used as a fingerprint sensor.

The exemplary pattern comprises an array of capacitive sensing pixels 205X,Y (referred collectively as pixels 205) arranged in X columns and Y rows in a common plane, wherein X and Y are positive integers, although one of X and Y may be zero. It is contemplated that the pattern of sensing pixels 205 may comprise a plurality of sensing pixels 205 having other configurations, such as polar arrays, repeating patterns, non-repeating patterns, non-uniform array a single row or column, or other suitable arrangement. Further, as will be discussed in more detail below, the sensor electrodes in the sensing pixels 205 may be any shape such as circular, rectangular, diamond, star, square, nonconvex, convex, nonconcave, concave, etc. As shown here, the sensing pixels 205 are coupled to the processing system 110.

In a first mode of operation, at least one sensor electrode within the capacitive sensing pixels 205 may be utilized to detect the presence of an input object via absolute sensing techniques. A sensor module 204 (e.g., a sensor circuit or sensor circuitry) in processing system 110 is configured to drive a sensor electrode using a trace 240 in each pixel 205 with a capacitive sensing signal (which can be modulated or unmodulated) and measure a capacitance between the sensor electrode and the input object (e.g., free space or earth ground) based on the capacitive sensing signal, which is utilized by the processing system 110 or other processor to determine the position of the input object or features in a finger.

The various electrodes of capacitive pixels 205 are typically ohmically isolated from the electrodes of other capacitive pixels 205. Additionally, where a pixel 205 includes multiple electrodes, the electrodes may be ohmically isolated from each other. That is, one or more insulators separate the sensor electrodes and prevent them from electrically shorting to each other.

In a second mode of operation, sensor electrodes in the capacitive pixels 205 are utilized to detect the presence of an input object via transcapacitance sensing techniques. That is, processing system 110 may drive at least one sensor electrode in a pixel 205 with a transmitter signal and receive resulting signals using one or more of the other sensor electrodes in the pixel 205, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

In some embodiments, the capacitive pixels 205 are "scanned" to determine these capacitive couplings. That is, in one embodiment, one or more of the sensor electrodes are driven to transmit transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The sensor electrodes configured as receiver sensor electrodes may be operated singly or multiply to acquire resulting signals. The resulting signals may be used to determine measurements of the capacitive couplings at the capacitive pixels 205.

In other embodiments, "scanning" pixels 205 to determine these capacitive coupling includes driving with a modulated signal (e.g., an alternating current (AC) signal) and measuring the absolute capacitance of one or more of the sensor electrodes. In another embodiment, the sensor electrodes may be operated such that the modulated signal is driven on a sensor electrode in multiple capacitive pixels 205 at the same time. In such embodiments, an absolute capacitive measurement may be obtained from each of the one or more pixels 205 simultaneously. In one embodiment, the input device 100 simultaneously drives a sensor electrode in a plurality of capacitive pixels 205 and measures an absolute capacitive measurement for each of the pixels 205 in the same sensing cycle. In various embodiments, processing system 110 may be configured to selectively drive and receive with a portion of sensor electrodes. For example, the sensor electrodes may be selected based on, but not limited to, an application running on the host processor, a status of the input device, an operating mode of the sensing device and a determined location of an input object. In another embodiment, the input object (e.g., a finger) is the transmitter that is driven with the modulated signal while the sensor electrode is a receiver.

A set of measurements from the capacitive pixels 205 form a capacitive image (also capacitive frame) representative of the capacitive couplings at the pixels 205 as discussed above. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In some embodiments, one or more of the sensor electrodes in the capacitive pixels 205 include one or more display electrodes used in updating the display of the display screen. In one or more embodiments, the display electrodes comprise one or more segments of a Vcom electrode (common electrodes), a source drive line, gate line, an anode electrode or cathode electrode, or any other display element. These display electrodes may be disposed on an appropriate display screen substrate. For example, the electrodes may be disposed on the transparent substrate (a glass substrate, TFT glass, a plastic substrate or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, an electrode that is used as both a sensor and a display electrode can also be referred to as a combination electrode, since it performs multiple functions.

Continuing to refer to FIG. 2, the processing system 110 coupled to the sensor electrodes includes a sensor module 204 and optionally, a display driver module 208. In one embodiment the sensor module comprises circuitry configured to drive a transmitter signal onto and receive resulting signals with the sensor electrodes during periods in which input sensing is desired. In one embodiment the sensor module 204 includes a transmitter module including circuitry configured to drive a transmitter signal onto the sensor electrodes during periods in which input sensing is desired. The transmitter signal is generally modulated and contains one or more bursts over a period of time allocated for input sensing. The transmitter signal may have an amplitude, frequency and voltage which may be changed to obtain more robust location information of the input object in the sensing region. The modulated signal used in absolute capacitive sensing may be the same or different from the transmitter signal used in transcapacitance sensing. The sensor module 204 may be selectively coupled to one or more of the sensor electrodes in the capacitive pixels 205. For example, the sensor module 204 may be coupled to selected portions of the sensor electrodes and operate in either an absolute or transcapacitance sensing mode. In another example, the sensor module 204 may be coupled to different sensor electrodes when operating in the absolute sensing mode than when operating in the transcapacitance sensing mode.

In various embodiments the sensor module 204 may comprise a receiver module that includes circuitry configured to receive a resulting signal with the sensor electrodes comprising effects corresponding to the transmitter signal during periods in which input sensing is desired. In one or more embodiments, the receiver module is configured to drive a modulated signal onto a first sensor electrode in one of the pixels 205 and receive a resulting signal corresponding to the modulated signal to determine changes in absolute capacitance of the sensor electrode. The receiver module may determine a position of the input object in the sensing region 120 or may provide a signal including information indicative of the resulting signal to another module or processor, for example, a determination module or a processor of the electronic device (i.e., a host processor), for determining the position of the input object in the sensing region 120. In one or more embodiments, the receiver module comprises a plurality of receivers, where each receiver may be an analog front end (AFE).

In one or more embodiments, capacitive sensing (or input sensing) and display updating may occur during at least partially overlapping periods. For example, as a combination electrode is driven for display updating, the combination electrode may also be driven for capacitive sensing. Or overlapping capacitive sensing and display updating may include modulating the reference voltage(s) of the display device and/or modulating at least one display electrode for a display in a time period that at least partially overlaps with when the sensor electrodes are configured for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiment, the non-display update period may be referred to as a long horizontal blanking period, long h-blanking period or a distributed blanking period. In other embodiments, the non-display update period may comprise horizontal blanking periods and vertical blanking periods. Processing system 110 may be configured to drive sensor electrodes for capacitive sensing during any one or more of or any combination of the different non-display update times.

The display driver module 208 includes circuitry confirmed to provide display image update information to the display of the display device during non-sensing (e.g., display updating) periods. The display driver module 208 may be included with or separate from the sensor module 204. In one embodiment, the processing system comprises a first integrated circuit comprising the display driver module 208 and at least a portion of the sensor module 204 (i.e., transmitter module and/or receiver module). In another embodiment, the processing system comprises a first integrated circuit comprising the display driver module 208 and a second integrated circuit comprising the sensor module 204. In yet another embodiment, the processing system comprises a first integrated circuit comprising a display driver module 208 and one of a transmitter module or a receiver module and a second integrated circuit comprising the other one of the transmitter module and receiver module.

Figure 3:
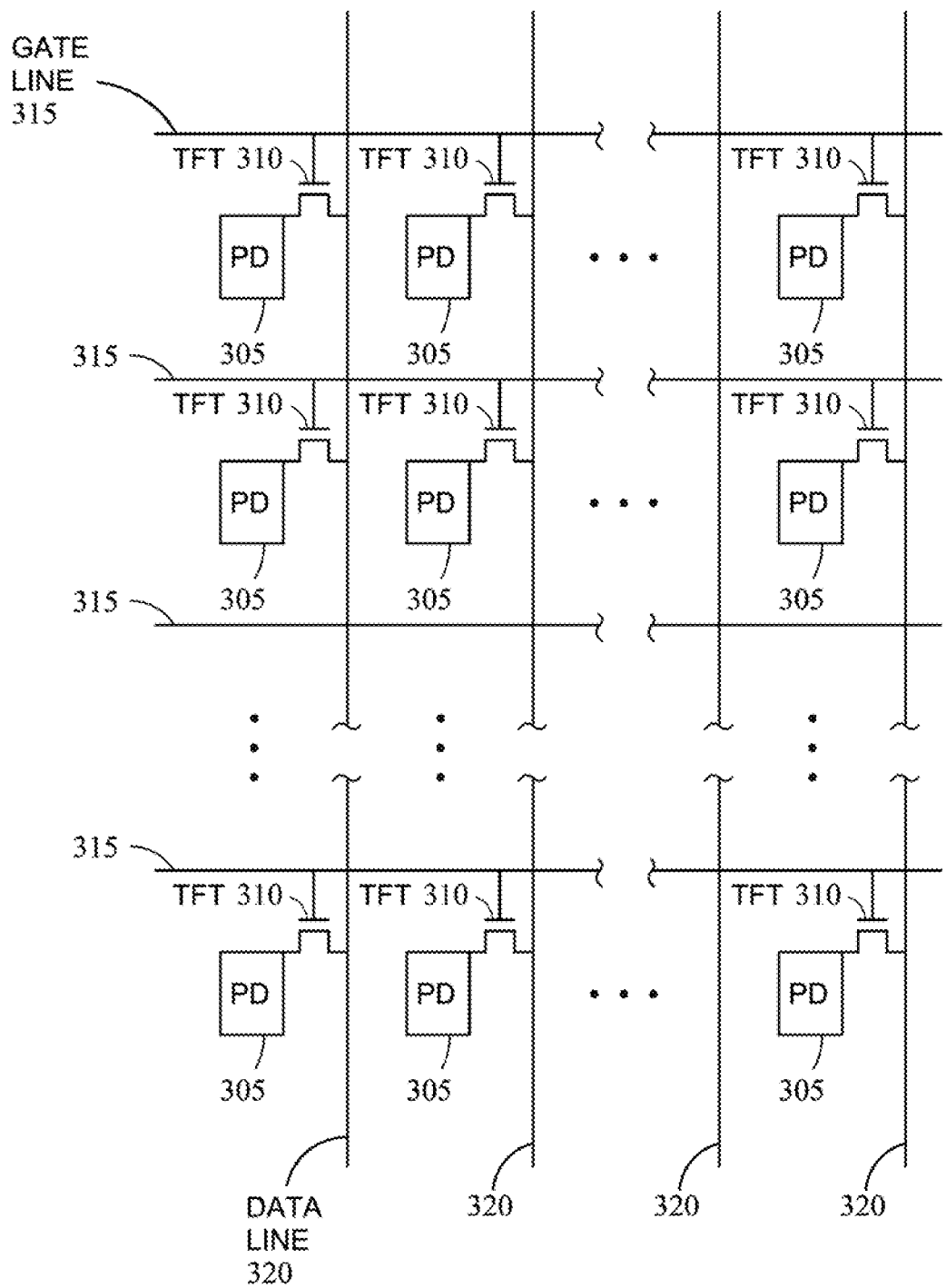
FIG. 3 illustrates an optical pixel array in an optical fingerprint sensor, in accordance with an embodiment described herein.

FIG. 3 illustrates an optical pixel array 300 in an optical fingerprint sensor, according to one embodiment. The optical pixel array 300 includes a plurality of photodiodes (PDs) 305 arranged into a rectangular matrix array which are coupled to data lines 320 using a respective thin-film transistor (TFT) 310. The TFTs 310 include gates that are coupled to respective gates lines 315. Each of the PDs 305 is connected to a data line 320 through a source and drain of the associated TFT 310. Driving different voltages on the gate lines 315 either activates (e.g., opens) or deactivates (e.g., closes) the TFTs 310. When activated, the TFTs 310 electrically couple the PDs 305 to the data lines 320. As described below, the data lines 320 can be used to pre-charge the PDs 305 and to measure voltages corresponding to the PDs 305 in order to capture a fingerprint for a human finger. When deactivated, the PDs 305 are electrically floating— i.e., are electrically disconnected for the data lines 320. Although not shown, each data line 320 may be coupled to a respective analog front end (AFE) (also called an optical AFE) which can measure charge, voltage, or currents corresponding to the PDs 305 to capture a fingerprint.

To use optical sensing to capture a fingerprint, one or more light sources (not shown in FIG. 3) may be included separate from or integrated within the optical pixel array 300, which emit light towards a sensing region where a finger is disposed. The light interacts with the finger (e.g., is reflected or scattered by the finger) and changes in the optical response due the interaction of the light with the finger are detected by the PDs 305. For example, the light reflected or scattered by the finger may be detected by the PDs. In one embodiment, the optical pixel array 300 includes gate driver circuitry which controls the voltages on the gate lines 315 in order to activate and deactivate the TFTs 310. In some embodiments, the gate driver circuitry includes a shift register which permits the optical fingerprint to raster through the rows. For example, when performing optical sensing, at any given time the device may couple only one row of the PDs 305 to the data lines 320 while the other rows of PDs 305 are disconnected from the data lines 320. The gate driver circuitry can use one of the gate lines 315 to activate all of the TFTs 310 coupled to the gate line 315 while driving voltages on the other gate lines 315 which deactivate the TFTs 310 in the remaining rows.

In one embodiment, the optical pixel array 300 connects a selected row of the PDs 305 to the data lines 320. The optical AFEs coupled to the data lines 320 pre-charge a capacitance corresponding to the PDs 305 in the selected row. After pre-charging the PDs 305 in the row, the gate line 315 deactivates the TFTs which disconnects the PDs 305 in the row from the data lines 320. While disconnected, one or more light sources emit light which interacts with the finger (if present) and at least a portion of the light is detected by the PDs 305 which changes a leakage current corresponding to the PDs 305 relative to a leakage current when no (or less) light strikes the PDs 305. The PDs 305 are then reconnected to the data lines 320 using the selected gate line 315 and the TFTs 310. The optical AFEs coupled to the data lines 320 then measure voltages corresponding to the PDs in the selected row. By measuring the voltage (or the change in the voltage), the input device can determine ridges and valleys in the finger in order to capture a fingerprint. However, this is just one example of performing optical sensing. The embodiments described herein can be used with other techniques for performing optical sensing to capture a fingerprint.

The optical pixel array 300 includes an area and a pitch suitable for capturing a fingerprint (e.g., a full or partial fingerprint area sufficient for reliably performing fingerprint authentication). In one embodiment, the optical pixel array 300 includes an area ranging from 20 mm$^2$ to 100 mm$^2$. In one embodiment, the optical pixel array 300 includes a pitch of photodiodes ranging from 5 microns to 100 microns. Other dimensions may be suitable for the optical pixel array 300 in some implementations. Although photodiodes are specifically mentioned, the embodiments herein can apply to other types of photosensors such as a phototransistor.

Figure 4:
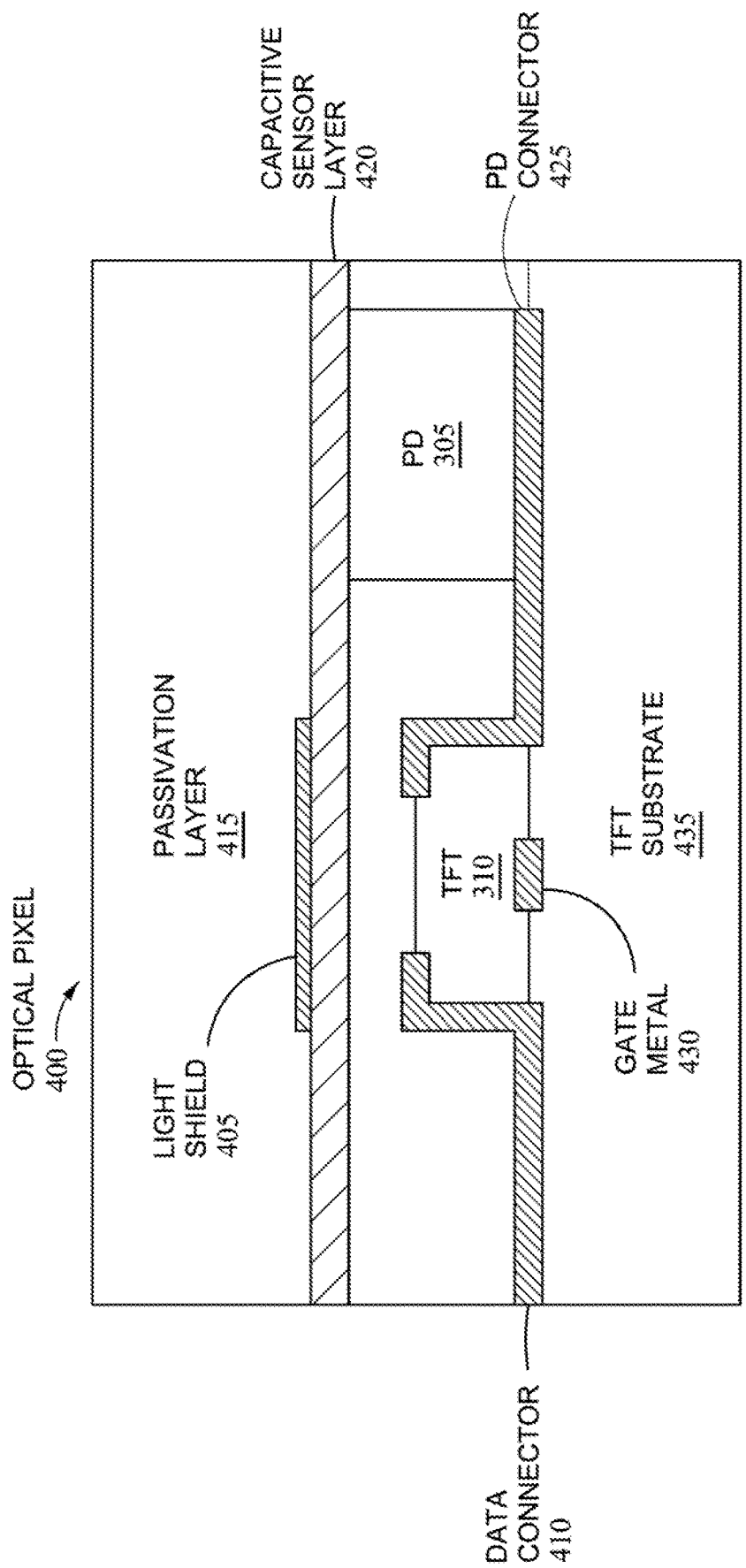
FIG. 4 illustrates an optical pixel, in accordance with an embodiment described herein.

FIG. 4 illustrates an optical pixel 400, according to one embodiment. Specifically, FIG. 4 is a schematic cross sectional view of one of the PDs 305 and TFTs 310 illustrated in FIG. 3. FIG. 4 illustrates the general electrical connections between the various components in the optical pixel 400. The particular spatial arrangement shown in FIG. 4 is exemplary and other arrangements are possible. The optical pixel 400 includes a TFT substrate 435 on which the TFT 310 (switch) and the PD 305 (photosensor) are disposed. In one embodiment, the TFT substrate 435 is made of glass. FIG. 4 is a simplified schematic to illustrate some functional components of the optical pixel 400 in a dual optical and capacitive sensor, but it should be understood that the optical pixel 400 can include various metal routing layers, insulation layers, and semiconductor layers disposed over the TFT substrate 435 in various configurations.

In the optical pixel 400, one terminal of the TFT 310 is coupled to a data connector 410 (e.g., data metal) which couples the TFT 310 to one of the data lines 320 shown in FIG. 3. Another terminal of the TFT 310 is coupled to a PD connector 425 which couples the TFT to the PD 305. A gate metal 430 is coupled to one of the gate lines 315 in FIG. 3 and controls a gate of the TFT 310 to form a conductive channel in the TFT 310. When formed, the conductive channel electrically connects the data connector 410 to the PD connector 425 to charge the PD 305 or to measure a voltage corresponding to the PD 305 as described above. Put differently, the gate metal 430 can activate and deactivate the TFT 310 in order to selectively couple the data connector 410 to the PD connector 425.

In one embodiment, the TFT 310 includes at least one doped active semiconductor layer (e.g., doped silicon) which can be used to form the conductive channel in response to the voltages driven on the gate metal 430. In one embodiment, the TFT 310 includes amorphous silicon. Because the active structures in the TFT 310 can be affected by light, the optical pixel 400 includes a light shield 405 which blocks some or all of the light emitted when performing optical sensing (as well as ambient light) from striking the TFT 310. The light shield 405 may be formed of an opaque metal layer.

As shown, the bottom surface of the PD 305 (e.g., a first surface) is coupled to the PD connector 425 while a top, opposite surface of the PD 305 (e.g., a second surface) is coupled to a capacitive sensor layer 420. In one embodiment, the capacitive sensor layer 420 may include one or more capacitive sensor electrodes. In one embodiment, the capacitive sensor layer 420 includes a single capacitive sensor electrode (e.g., to detect a presence of a finger) which is connected to all of the PDs 305 in the optical pixel array. In another embodiment, the capacitive sensor layer 420 includes a plurality of capacitive sensor electrodes arranged in a pattern having a lower resolution and/or lower sensor pitch between electrodes than the optical pixel array. In this embodiment, one of the capacitive sensor electrodes may be electrically connected to multiple ones of the PDs 305 in the pixel array. In yet another embodiment, the capacitive sensor layer 420 includes a plurality of capacitive sensor electrodes arranged in a pattern having the same resolution or sensor pitch between electrodes as the optical pixel array. In this embodiment, each of the capacitive sensor electrodes may be electrically connected to a respective one of the PDs 305 in the optical pixel array. When performing optical sensing, the capacitive sensor layer 420 is coupled to a reference or bias voltage (referred to herein as Vcom). When performing optical sensing, the capacitive sensor electrodes, which are electrically coupled to the PD 305, are held at a constant, unmodulated voltage. However, when performing capacitive sensing, the sensor electrodes in the capacitive sensor layer 420 may be driven with a capacitive sensing signal (e.g., an AC signal) in order to detect the presence or movement of an input object in the sensing region.

In one embodiment, the sensing region is the area above a top surface of the input device (which may be a top surface of the passivation layer 415 or a top surface of an additional cover layer disposed above the passivation layer 415, such as a cover glass). By performing capacitive sensing using the capacitive sensor layer 420, the input device can determine when an input object is proximate to the optical pixel 400—i.e., when the input object is in the sensing region. In some embodiments, input object does not need to contact the input surface in order to be detected by the capacitive sensor layer 420, but can be hovering over the input surface. In some embodiments, the input object is detected by the capacitive sensor layer 420 when it is in contact with the input surface over the PD 305.

The passivation layer 415 may be a dielectric material. Moreover, the passivation layer 415 and the capacitive sensor layer 420 may be formed from optically transparent material such that light from the sensing region can pass through these layers in order to reach the PD 305. In one embodiment, the capacitive sensor layer 420 is formed of a transparent conductor, such as indium tin oxide (ITO), which is optically transparent but also is conductive. In that way, the capacitive sensor layer 420 can be driven to Vcom during optical sensing and can be driven with a capacitive sensing signal when the fingerprint performs capacitive sensing. In one embodiment, the capacitive sensor layer 420 may also be referred to as an ITO bias layer.

Figure 5:
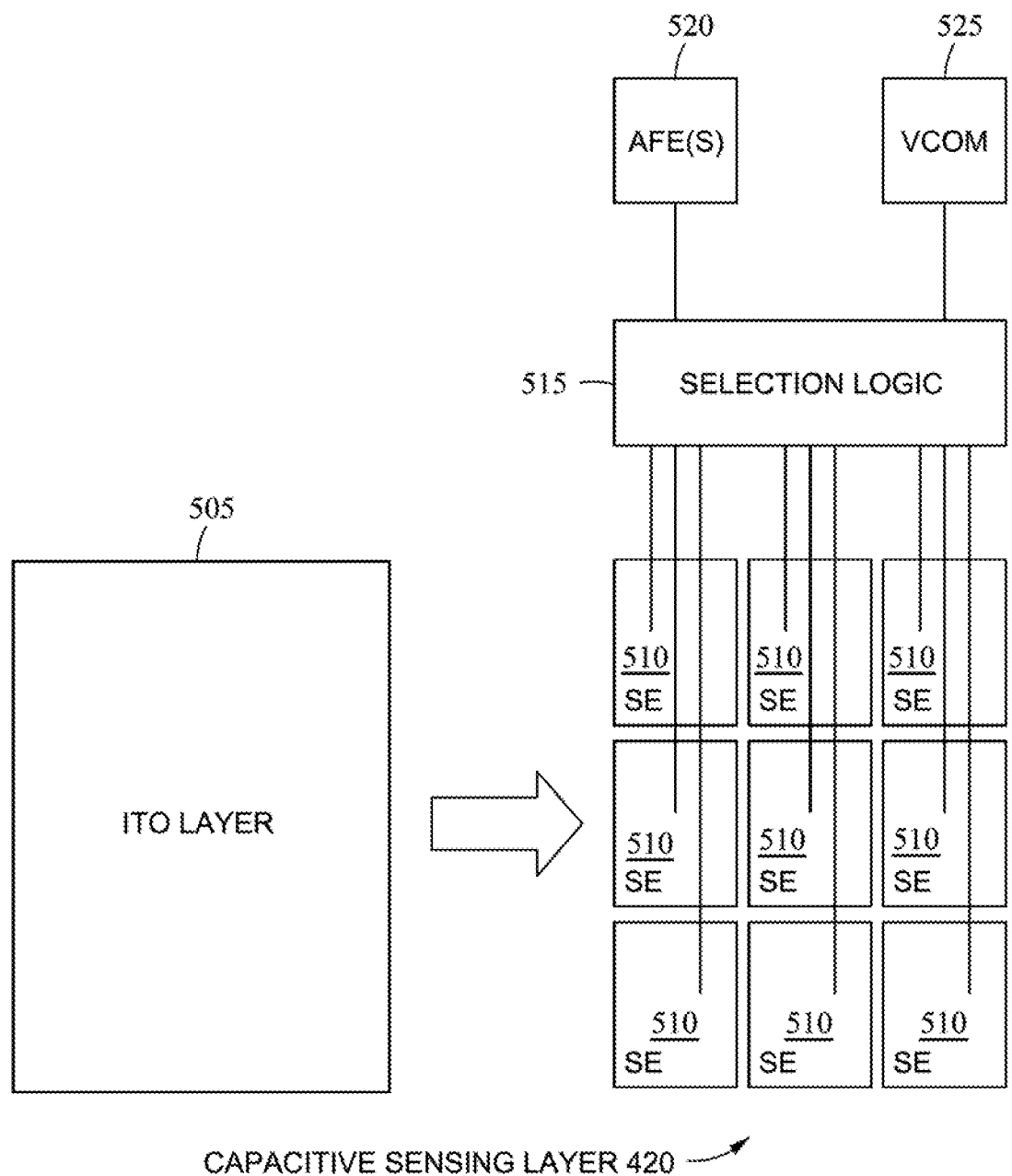
FIG. 5 illustrates dividing an ITO layer into the capacitive sensing layer with multiple sensor electrodes, in accordance with an embodiment described herein.

FIG. 5 illustrates dividing an ITO layer 505 into the capacitive sensor layer 420 with multiple sensor electrodes (SEs) 510. FIG. 5 illustrates a top view of the ITO layer 505 and the capacitive sensor layer 420. As shown, the PDs (which are connected to the bottom surface of the ITO layer 505 and the capacitive sensor layer 420) are not shown. The ITO layer 505 in the left of FIG. 5 includes a single ITO electrode (which can be connected to all of the PDs of the optical pixel array). The ITO layer 505 can be held at a reference voltage during optical sensing with the photodiode array (e.g., to detect a presence or absence of a finger). The capacitive sensor layer 420 in the right of FIG. 5, by contrast, is divided into multiple sensor electrodes 510 (nine in this example). Rather than having a single, continuous sheet of ITO material, the capacitive sensor layer 420 is divided into individual sensor electrodes 510 which are electrically insulated from each other. Like the ITO layer 505, each of the sensor electrodes 510 can be coupled to at least one of the PDs at the bottom surface.

Each of the sensor electrodes 510 includes an electrical connection to selection logic 515. For example, the optical fingerprint sensor may include vias and/or a conductive routing layer for connecting each of the sensor electrodes 510 to the selection logic 515.

The selection logic 515 can include multiplexers, switches, and the like for selectively coupling the sensor electrodes to one or more AFEs 520 or to Vcom 525. For example, when performing capacitive sensing, the selection logic 515 connects one or more of the sensor electrodes 510 to at least one of the AFEs 520 and disconnects the sensor electrodes 510 from Vcom 525. When performing optical sensing, the selection logic 515 connects the sensor electrodes 510 to Vcom 525 and disconnects the sensor electrodes 510 from the AFEs 520.

The AFEs 520 in FIG. 5 may be different from the optical AFEs connected to the data lines 320 shown in FIG. 3 which are used for performing optical sensing. That is, in one embodiment, the AFEs 520 used to perform capacitive sensing are different from the AFEs used to perform optical sensing. When performing capacitive sensing, only one sensor electrode 510 may be coupled to one AFE 520, multiple sensor electrodes 510 may be coupled to the same AFE 520, or multiple sensor electrodes 510 may each be coupled to a respective one of the AFEs 520. That is, the selection logic 515 can connect multiple sensor electrodes 510 to a single AFE 520 or connect each of the sensor electrodes 510 to a respective one of the AFEs 520. These different configurations and their functions are described in more detail in FIGS. 9 and 10.

Although the sensor electrodes 510 are illustrated in FIG. 5 as being formed from the ITO layer which couples to the PDs, in another embodiment, one or more dedicated sensing electrodes can be used for capacitive sensing instead of or in addition to the Vcom electrode for the photodiode.

Figure 6:
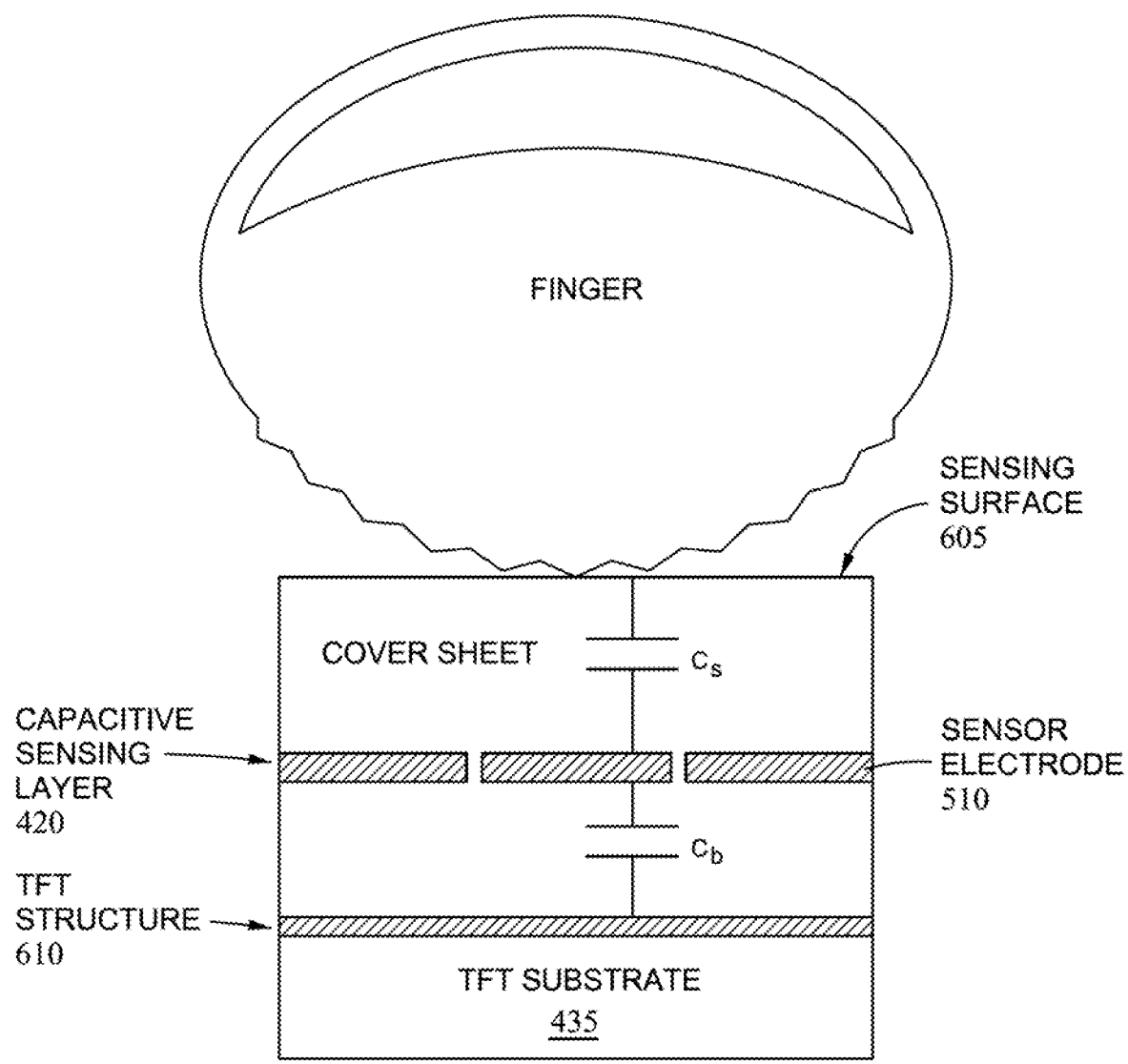
FIG. 6 illustrates a finger capacitively coupled to the sensor electrodes in the capacitive sensing layer, in accordance with an embodiment described herein.

FIG. 6 illustrates a finger capacitively coupled to the sensor electrodes 510 in the capacitive sensor layer 420. As shown, the finger can contact (or hover over) a sensing surface 605 which is in the sensing region. In this example, the sensing surface 605 may be the outermost or external surface of the input device. The capacitive coupling between the finger and the sensor electrode 510 is represented in FIG. 6 as C. By measuring the change in this capacitive coupling, the input device can determine a presence of the finger, and in some embodiments, a location of the finger relative to the sensing surface 605 or a movement of the finger along the sensing surface 605.

In addition to being capacitive coupled to the finger, the sensor electrodes 510 are capacitively coupled to a TFT structure 610. The TFT structure 610 may include all or some of the different layers and components that are part of the TFTs as well as the electrical components that are coupled to the TFTs. For example, the TFT structure 610 may include the data connector 410, TFT 310, gate metal 430, and PD connector 425 shown in FIG. 4. The combined capacitive coupling between the conductive elements in the TFT structure 610 and the sensor electrodes 510 in the capacitive sensor layer 420 is represented by $C_b$ (i.e., a background capacitance). In some embodiments, the capacitive coupling $C_b$ between the sensor electrodes 510 and the TFT structure 610 may be orders of magnitude larger than the capacitive coupling $C_s$ between the sensor electrodes 510 and the finger. The TFT structure 610 may be strongly coupled to ground (GND) which means it is difficult to drive a capacitive sensing signal on one or more of the sensor electrodes 510 in order to measure the capacitive coupling to the finger (i.e., $C_s$) because of the much stronger capacitive coupling to the TFT structure 610 (i.e., $C_b$).

To mitigate or remove the negative effect of the capacitance $C_b$ when performing capacitive sensing, the input device can drive conductive material in the TFT structure 610 using the same capacitive sensing signal being driven on the sensor electrodes 510 in the capacitive sensor layer 420. For example, if the capacitive sensing signal is a modulated (e.g., AC) square wave or sine wave, the input device drives that same modulated square wave or since wave onto one or more components in the TFT structure 610. Stated differently, because the voltage across the background capacitance $C_b$ remains the same, the capacitive coupling to the TFT structure 610 does not affect the capacitive sensing measurements. Because the voltage on the sensor electrodes 510 changes the same as the voltage on the conductive components in the TFT structure 610, the capacitance $C_b$ is effectively removed from the circuit (or at least its effects are mitigated). Instead, only the capacitance $C_s$ between the finger and the sensor electrodes 510 affects the capacitive sensing measurements.

In one embodiment, the input device may drive the capacitive sensing signal (e.g., an AC signal) on gate lines, Vcom layers, CLK signals, and a start pulse lines which are in the TFT structure 610. For example, the input device may include a gate driver circuitry disposed on a common substrate with the capacitive sensing layer 420. By transmitting the capacitive sensing signal to the gate driver circuitry, the processing system can indirectly drive the capacitive sensing signal on the gate lines (e.g., the gate metal 430 in FIG. 4 which control the TFT 310 coupled to the PD 305). In other embodiments, however, the processing system can drive the capacitive sensing signal directly on the gate lines. In this manner, the conductive material in the TFT structure 610 is driven in a same manner as the sensor electrodes 510, and thus, the effect of the capacitance $C_b$ is mitigated. For instance, the input device can drive the capacitive sensing signal on $V_H$ and $V_L$ rails which are used to drive the gate lines in order to activate and deactivate the TFTs in the TFT structure 610. Moreover, the TFT structure 610 may include one or more additional Vcom layers (different from the capacitive sensor layer 420 or ITO bias layer) which can also be driven using the capacitive sensing signal so that the voltage on these Vcom layers changes in the same manner as the voltage on the sensor electrodes 510.

The TFT structure 610 can also include CLK signals which control the operation of gate drive circuitry. For example, the CLK signals may be used to raster thought the gate lines 315 in order to select the rows of PDs 305 shown in FIG. 5. Because the conductive material used to transmit the CLK signals can be located in the TFT structure 610, the capacitive sensing signal is driven on that conductive material to mitigate the background capacitance $C_b$. Moreover, the gate drive circuitry may be coupled to a START PULSE line which determines when the gate drive circuitry begins to raster through the gates lines 315. This line can also be driven with the capacitive sensing signal when performing capacitive sensing.

The capacitive sensing signal can be driven onto other conductive materials in the optical fingerprint sensor when performing capacitive sensing in addition to the TFT structure 610. For example, the capacitive sensing signal may be driven on Vcom layers or the data lines 320 which may be outside the TFT structure 610. However, in other embodiments, some of the conductive materials in the optical fingerprint sensor are electrically floating when performing capacitive sensing. For example, the data line 320 may be disposed between two Vcom layers which are driven by the capacitive sensing signal during capacitive sensing. As such, floating the data lines 320 may be sufficient since the two Vcom layers prevent any capacitive coupling between the data lines 320 and the sensor electrodes 510 from affecting the capacitive sensing measurements. To float the data lines 320, the input device may include switches at the input of the optical AFEs which disconnect the data lines 320 from the AFEs when performing capacitive sensing. The data lines 320 can be reconnected to the optical AFEs when performing optical sensing. In this manner, the conductive material proximate to the sensor electrodes 510 in the optical fingerprint sensor can be driven using the same capacitive sensing signal or electrically floated in order to mitigate the negative effect the background capacitance $C_b$ has on performing capacitive sensing.

Figure 7:
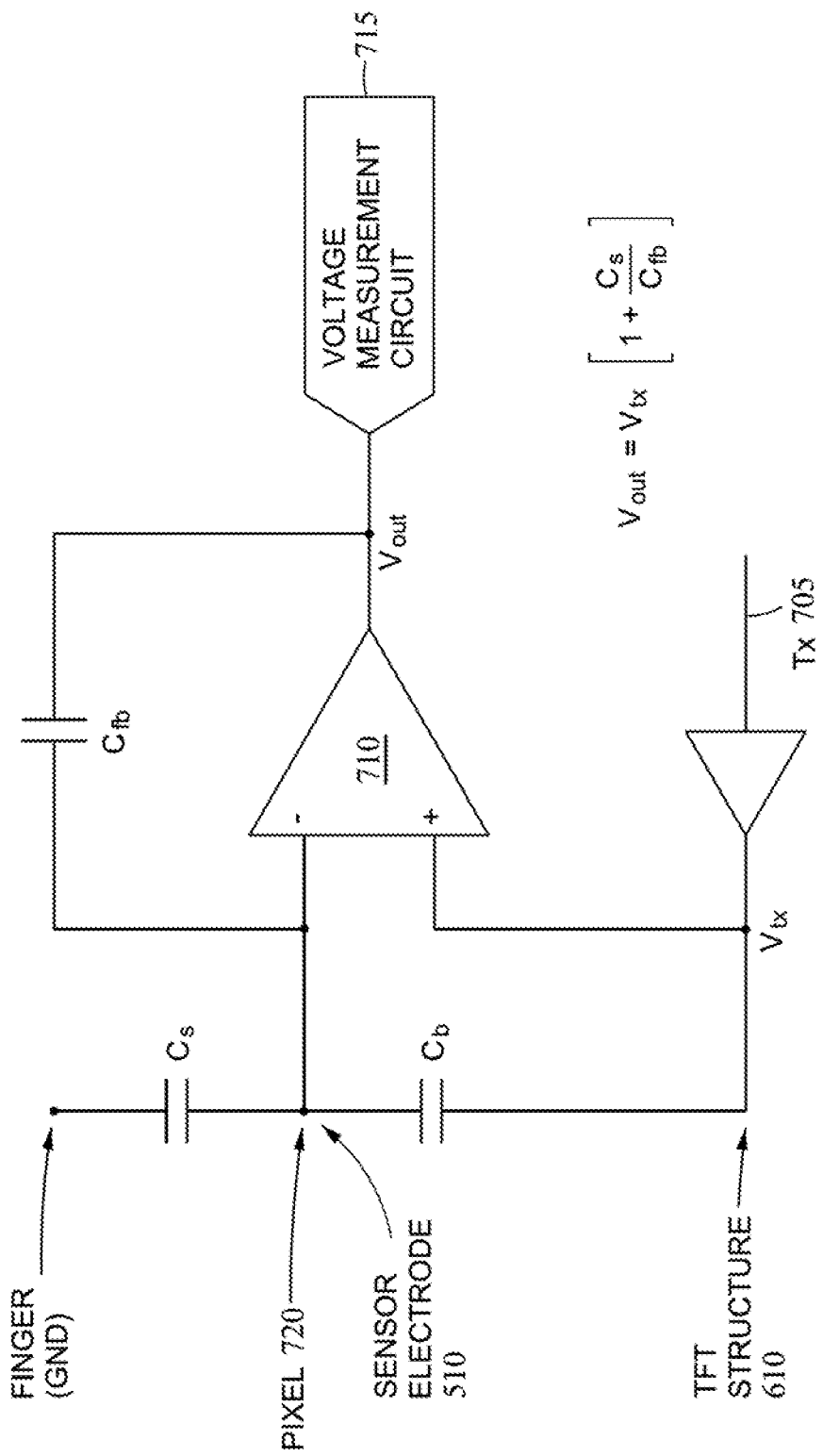
FIG. 7 illustrates driving the capacitive sensing signal onto the sensor electrode and the TFT structure in the optical sensor, in accordance with an embodiment described herein.

FIG. 7 illustrates driving the capacitive sensing signal onto the sensor electrode 510 and the TFT structure 610 in the optical sensor. As shown, the pixel 720, and more specifically, the sensor electrode 510 is capacitively coupled to the finger via the capacitance $C_s$ while the TFT structure 610 is capacitively coupled to the sensor electrode 510 via the capacitance $C_b$. The capacitive sensing signal (i.e., $V_{tx}$) is driven by a transmitter (TX) 705 onto the conductive material in the TFT structure 610 and into the positive terminal of an op amp 710. In turn, the op amp 710 drives the capacitive sensing signal $V_{tx}$ onto its negative terminal and the sensor electrode 510. Thus, the voltage on the conductive material in the TFT structure 610 changes in the same manner as the voltage on the sensor electrode 510 thereby mitigating the effects of the capacitance $C_b$ on the output voltage $V_{out}$. As shown, the output voltage $V_{out}$ can be represented by the equation:

$$V_{out} = V_{tx}\left[1 + \frac{C_s}{C_{fb}}\right]$$

Thus, the output voltage $V_{out}$ is not affected by the background capacitance $C_b$ and is proportional to the capacitance $C_s$.

In one embodiment, the op amp 710, the feedback capacitor $C_{fb}$, and the voltage measurement circuit 715 are part of an AFE which can be selectively coupled to the sensor electrode 510. That is, these components may be part of one of the AFEs 520 illustrated in FIG. 5 which can be selectively coupled to the sensor electrodes 510 using the selection logic 515 (which is not shown in FIG. 7).

Although not described in detail herein, in one embodiment, the voltage measurement circuit 715 measures $V_{out}$ in order to identify a change in the capacitance $C_s$ between the sensor electrode 510 and the finger. By tracking this change in capacitance, the input device can detect a presence of the finger in the sensing region, determine a gesture made by the finger in the sensing region such as a tap, double tap, swipe, etc., or determine other information regarding the finger based on the sensed capacitance.

Figure 8:
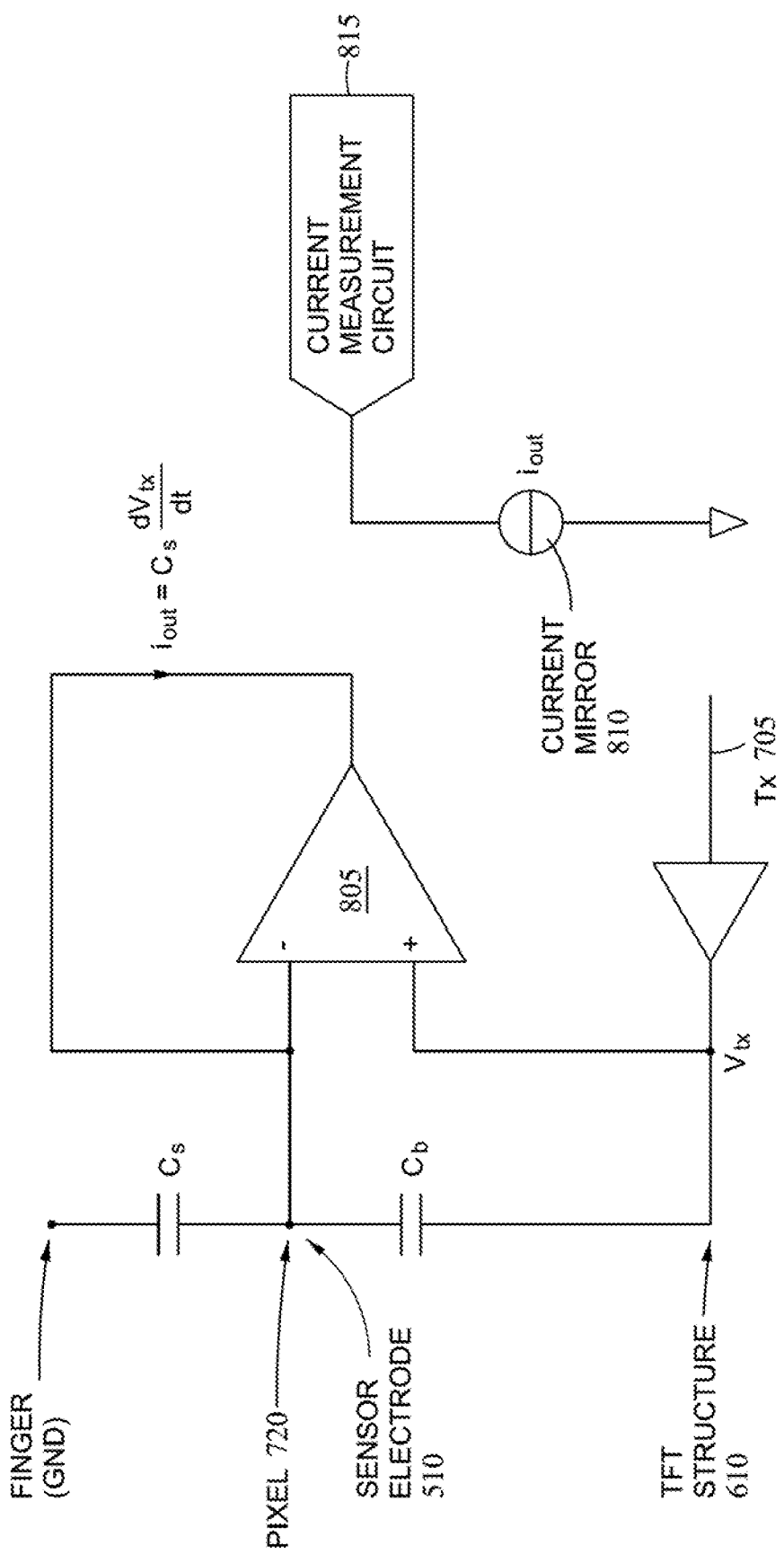
FIG. 8 illustrates driving the capacitive sensing signal onto the sensor electrode and the TFT structure in the optical sensor, in accordance with an embodiment described herein.

FIG. 8 illustrates driving the capacitive sensing signal onto the sensor electrode 510 and the TFT structure 610 in the optical sensor. Like in FIG. 7, FIG. 8 illustrates a circuit where the TX 705 drives the capacitive sensing signal $V_{TX}$ onto both the TFT structure 610 and the sensor electrode 510. Specifically, the TX 705 drives the capacitive sensing signal $V_{TX}$ onto a positive input of an op amp 805 which in turn drives the capacitive sensing signal $V_{TX}$ onto its negative input which is coupled to the sensor electrode 510 which mitigates or removes the effect of the background capacitance $C_b$ on the capacitive sensing measurement.

Instead of generating an output voltage, the op amp 805 generates an output current $i_{out}$ which is proportional to the coupling capacitance $C_s$. The output current can be represented by:

$$i_{out} = C_s \frac{dV_{tx}}{dt}$$

A current mirror 810 generates a copy of the output current $i_{out}$ which is sampled by a current measurement circuit 815 in order to detect changes in the coupling capacitance $C_s$ between the sensor electrode 510 and the finger. By tracking this change in capacitance, the input device 715 can detect a presence of the finger in the sensing region, determine a gesture made by the finger in the sensing region such as a tap, double tap, swipe, etc., or determine other information regarding the finger based on the sensed capacitance.

Figure 9:
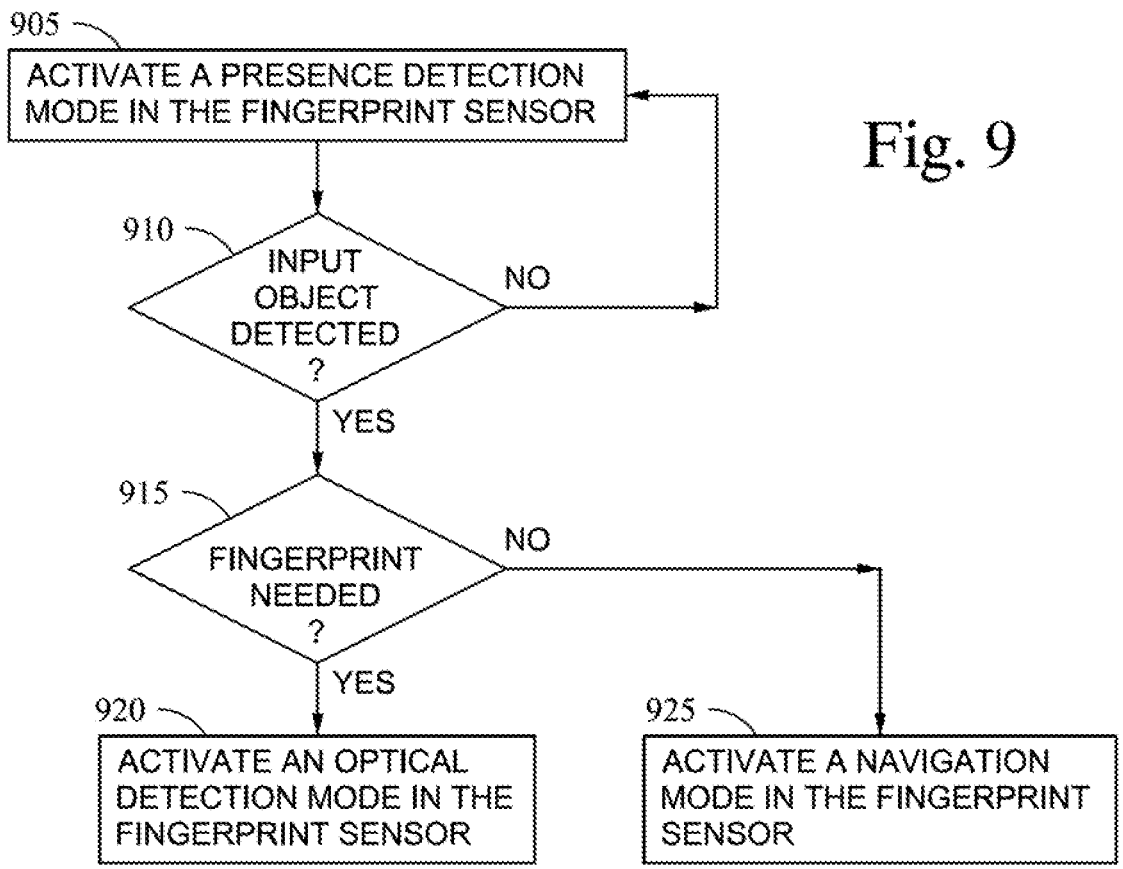
FIG. 9 is a flowchart of a method for operating an optical fingerprint sensor that includes capacitive sensor electrodes, in accordance with an embodiment described herein.

FIG. 9 is a flowchart of a method for operating an optical fingerprint sensor that includes capacitive sensor electrodes. At block 905, the fingerprint sensor activates a presence detection mode. During this mode, the fingerprint sensor performs capacitive sensing using one or more of the sensor electrodes 510 in the capacitive sensor layer 420 illustrated in FIG. 5. Although FIG. 5 illustrates multiple sensor electrodes 510 in the layer 420, in another embodiment, the layer 420 may include only a single sensor electrode 510. For example, if the input device only wants to detect a presence of the finger in the sensing region rather than determine a specific location of the finger in the fingerprint sensor or a movement of the finger in the sensing region, then a single sensor electrode 510 may be sufficient. For instance, if the input device wants to use capacitive sensing only to detect a presence of the finger or to detect simple gestures such as a tap or double tap, then the ITO layer 505 (e.g., a single conductive sheet of ITO) may be coupled to the selection logic 515 rather than forming multiple sensor electrodes 510 in the layer 420. However, the embodiments below assume that the ITO layer 505 has been divided into multiple sensor electrodes 510 as shown in FIG. 5.

In one embodiment, the presence detection mode is used to perform a wake-up feature in the input device. The input device may put the fingerprint sensor in a low-power state (e.g., deactivate optical sensing) where capacitive sensing is performed using one or more of the sensor electrodes in the capacitive sensing layer. As mentioned above, capacitive sensing may require less power than optical sensing, thereby saving power and battery life for mobile input devices. Further, capacitive sensing may provide more reliable finger detection than optical sensing, in some implementations.

In addition to placing the fingerprint sensor in the low-power mode, other components in the input device may be in a low-power mode. For example, if the user does not interact with an input device (e.g., a touch screen) within a timeout period, the input device may turn off the display and deactivate the touch screen. The presence detection mode can be used to detect the presence of an input object which the input device uses to wake up these components (e.g., turn on the display, began performing capacitive sensing with the touch screen, or begin performing optical fingerprint sensing). Put differently, in one embodiment, the presence detection mode of the fingerprint sensor can be used to switch other components in the input device from a low-power mode to a normal operation mode.

In one embodiment, when performing capacitive sensing, the fingerprint sensor does not perform optical sensing. For example, because in some embodiments the components used to perform capacitive sensing are also used to perform optical sensing, the fingerprint sensor does not perform these two functions in overlapping time periods. For example, referring to FIG. 4, the capacitive sensor layer 420 includes sensor electrodes 510 which are used during capacitive sensing to drive a capacitive sensing signal but during optical sensing are used to connect the PDs 305 to Vcom (e.g., an unmodulated reference signal). In this example, the capacitive sensor layer 420 is dual-purposed to be used during both capacitive sensing and optical sensing. However, in other embodiments, if the capacitive sensor electrodes are independent from the components used to perform optical sensing (and the background capacitive coupling between the sensor electrodes and the optical components is sufficiently small), the fingerprint sensor may perform optical sensing while also performing capacitive sensing.

At block 910, the input device determines whether the fingerprint sensor has detected the presence of the input object (e.g., a finger or stylus) when operating in the presence detection mode (i.e., when performing capacitive sensing). If not, the method returns to block 905, but if an input object is detected, the method proceeds to block 915 where the input device determines whether a fingerprint is needed.

In one embodiment, the input device may determine what application is currently executing in the host CPU. For example, a banking application may currently be operating which requires the user's fingerprint in order to access secure financial records. The banking application may trigger a flag indicating it is waiting for a fingerprint in order to proceed. At block 915, the input device may determine if any applications have triggered the flag. If so, the method proceeds to block 920 where the fingerprint sensor activates an optical detection mode in order to capture a fingerprint.

However, if no applications are currently waiting for a fingerprint, the method proceeds to block 925 where the fingerprint sensor activates a navigation mode. In one embodiment, the navigation mode enables the fingerprint sensor to detect more granular information about the input object when compared to the presence detection mode which may only detect whether an input object is in the sensing region. For example, in the navigation mode, the fingerprint sensor may determine a specific location of the input object in the sensing region established by the capacitive sensing layer in the sensor. Or the fingerprint sensor may determine movement (e.g., a speed and direction) of the input object in the sensing region which can be correlated to a swiping gesture. This information can be used by the input device to perform corresponding actions such moving a cursor, switching between applications or pages outputted in a display, opening an application, activating a displayed button or feature, and the like.

Figure 10A:
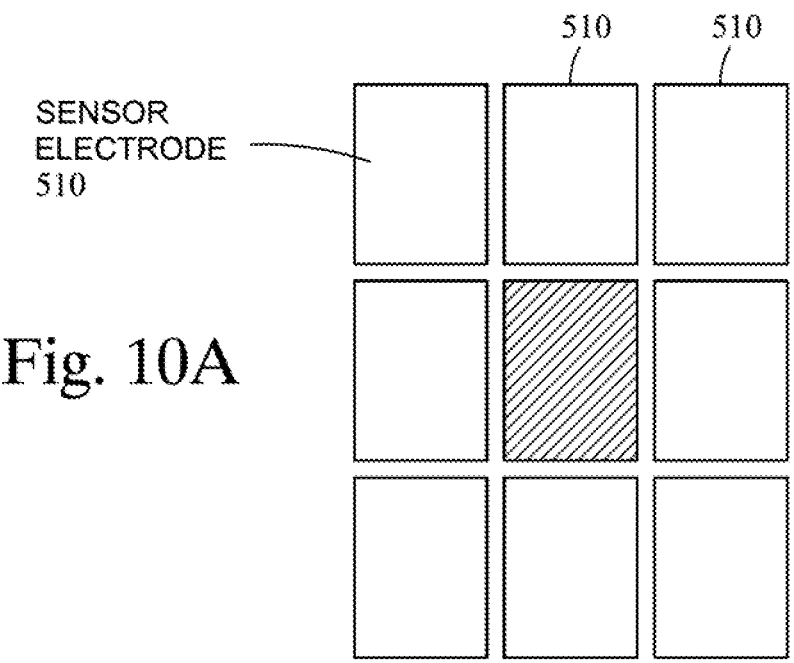
FIGS. 10A-10C illustrates operating the fingerprint sensor during the presence detection mode, in accordance with embodiments described herein.

FIG. 10A illustrates one example of operating the fingerprint sensor during the presence detection mode. As shown in FIG. 10A, only the middle sensor electrode 510 is coupled to an AFE in order to perform capacitive sensing. That is, the selection logic (not shown) couples the middle electrode to an AFE which then measures changes in the capacitance in order to detect the presence of an input object as described in block 905 of FIG. 9. Moreover, while driving the capacitive sensing signal onto the middle electrode, the capacitive sensing signal may also be driven onto the TFT structure in order to mitigate or remove the background capacitance illustrated in FIGS. 7 and 8. Further still, the capacitive sensing signal may also be driven on the surrounding sensor electrodes 510 that are not being sensed in order to mitigate or remove the capacitive coupling between the sensor electrodes. However, in another embodiment, the surrounding sensor electrode 510 may be electrically floating.

Figure 10B:
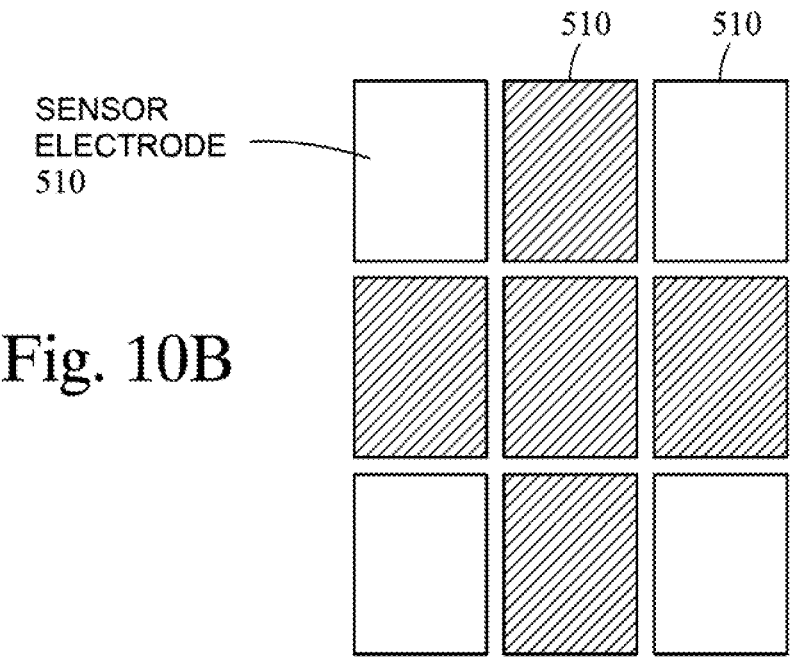

FIG. 10B illustrates one example of operating the fingerprint sensor during the presence detection mode. In FIG. 10B, multiple sensor electrodes 510 (but not all of them) are sensed during the presence detection mode at block 905 of FIG. 9. In this embodiment, the selection logic may couple the shaded electrodes 510 (five out of the nine electrodes 510) to the same AFE. That is, the shaded sensor electrodes 510 are all electrically coupled together to essentially form one large sensor electrode. Doing so may improve the signal to noise ratio or improve the responsiveness of the sensor area to a finger when performing capacitive sensing, relative to using only one sensor electrode 510 as shown in FIG. 10A, and thus, make detecting the presence of the input object easier.

While driving the capacitive sensing signal onto the shaded electrodes 510, the capacitive sensing signal may also be driven onto the TFT structure in order to mitigate or remove the background capacitance illustrated in FIGS. 7 and 8. Further still, the capacitive sensing signal may also be driven on the non-shaded sensor electrodes 510 that are not being sensed in order to mitigate or remove the capacitive coupling between the sensor electrodes. However, in another embodiment, the surrounding sensor electrode 510 may be electrically floating.

Figure 10C:
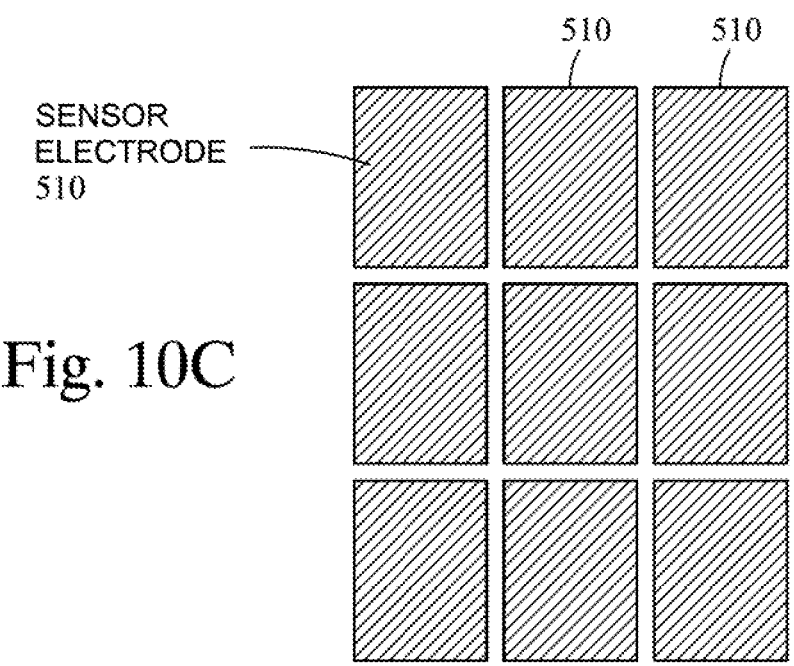

FIG. 10C illustrates one example of operating the fingerprint sensor during the presence detection mode. In FIG. 10C, all the sensor electrodes 510 in the capacitive sensing layer are sensed during the presence detection mode at block 905 of FIG. 9. In this embodiment, the selection logic may couple all the sensor electrodes 510 to the same AFE effectively forming one large sensor electrode. Doing so may improve the signal to noise ratio when performing capacitive sensing relative to using the sensing patterns shown in FIGS. 10A and 10B at the tradeoff off increased power consumption. Moreover, while driving the capacitive sensing signal onto the shaded electrodes 510, the capacitive sensing signal may also be driven onto the TFT structure in order to mitigate or remove the background capacitance illustrated in FIGS. 7 and 8.

Moreover, when operating in the navigation mode, the fingerprint sensor may also drive all the sensor electrodes 510 with a capacitive sensing signal as shown in FIG. 10C. However, the resulting signal for each of the sensor electrodes 510 is measured individually. Instead of coupling all the sensor electrodes 510 to the same AFE, when in the navigation mode, the sensor electrodes 510 may each be coupled to a respective AFE such that the input device can measure capacitive sensing measurements for each individual sensor electrodes. Alternatively, the selection logic may be used to individually measure multiple sensor electrodes in a time multiplexed sequence using the same AFE. In this manner, the input device can identify a location of the input object (e.g., a stylus is located in the center of the fingerprint sensor or more towards the upper right corner of the fingerprint sensor) as well as the movement of the input object (e.g., from the center of the sensor to the right of the sensor).

In FIGS. 10A-10C, the fingerprint sensor relies on absolute capacitive sensing in order to detect a presence or gesture of the input object in the sensing region when in the presence detection mode or the navigation mode. However, in other embodiments, the fingerprint sensor may use transcapacitive sensing to perform capacitive sensing.

Figure 11A:
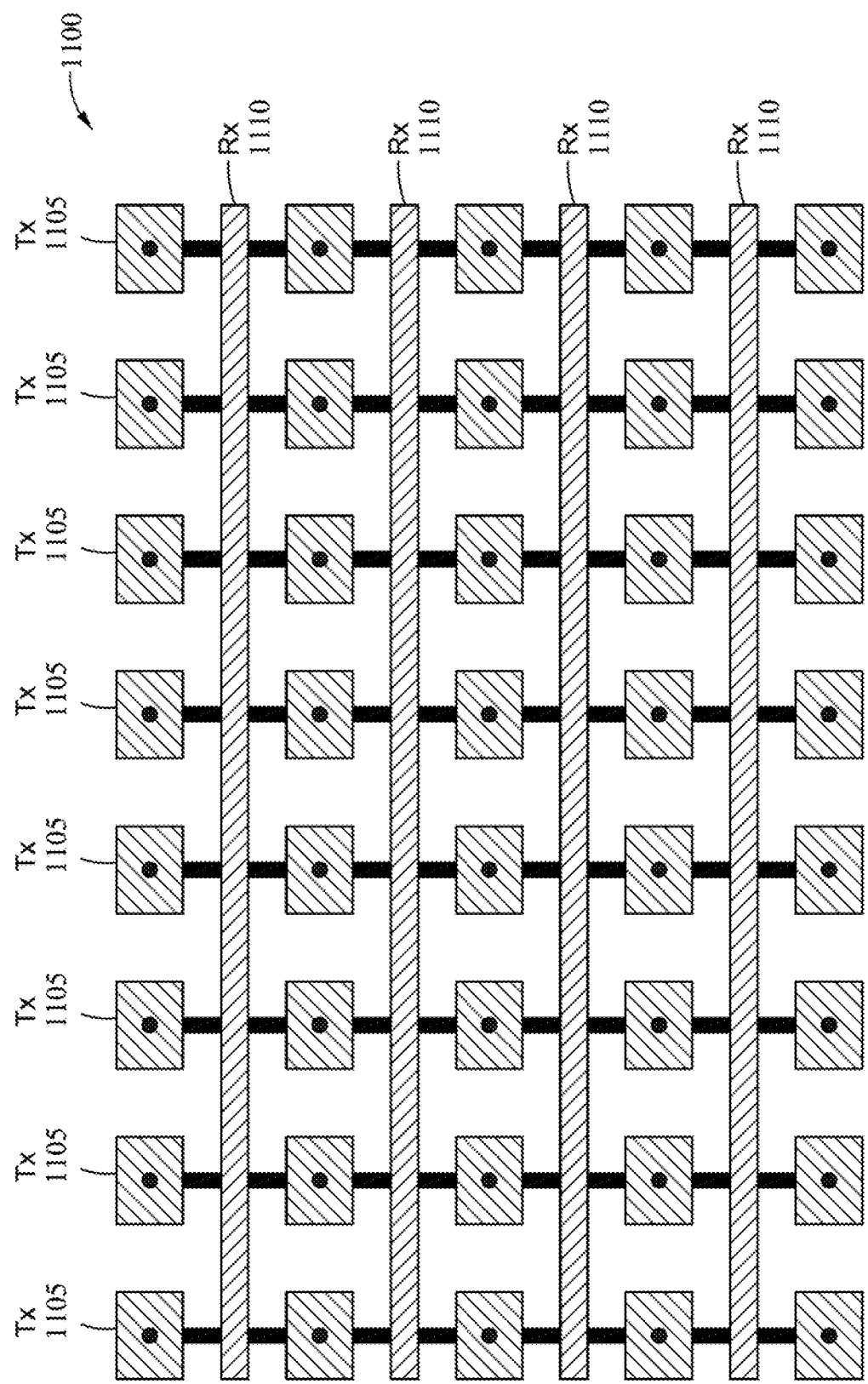
FIG. 11A illustrates a transcapacitive sensing structure, in accordance with an embodiment described herein.

FIG. 11A illustrates a transcapacitive sensing structure. FIG. 11A illustrates a layer 1100 on which transmitter (TX) electrodes 1105 are disposed along with receiver (RX) electrodes 1110. That is, the TX electrodes 1105 and the RX electrodes 1110 (which are formed from ITO as shown by the hashing) may be co-planar with each other (e.g., disposed on the same surface or substrate). Moreover, FIG. 11 illustrates metal routing (shown in black) underneath the RX electrodes 1110 which electrically interconnects different portions of the TX electrodes 1105. The metal routing is disposed on a different layer than the TX and RX electrodes 1105, 1110 so that the TX and RX electrodes 1105, 1110 are electrically insulated from each other. In one embodiment, the metal routing includes metal traces disposed in the same metal layer as is used for the optical pixel routing and interconnections. The metal routing may include routing extending through the photodiode array (e.g., between photodiodes), to connect the lower metal layer to the upper TX electrodes in the Vcom layer. In one embodiment, the metal routing can be connected to the TX electrodes 1105 using vias.

In one embodiment, the TX and RX electrodes 1105, 1110 may be formed in the ITO layer 505 shown in FIG. 5. That is, rather than dividing the ITO layer 505 into the sensor electrodes 510 as shown, the ITO layer 505 can be formed to include the TX and RX electrodes 1105, 1110 shown in FIG. 11. The input device may detect a transcapacitance (or mutual capacitance) between TX and RX electrodes 1105, 1110. FIG. 11 shows a rectangular grid with orthogonal TX and RX electrodes 1105, 1110. Any suitable time multiplexed and/or coded sequence can be used to detect a capacitance associated with each crossover location. In other embodiments, any other regular or irregular pattern may be used. Further, in some embodiments the input device is configured to operate in a transcapacitive sensing mode to detect transcapacitance between any two or more of the capacitive sensor electrodes, including any grouping of parallel or perpendicular electrodes, without a need to sense at every one of the electrodes.

In another embodiment, one, some, or all of the TX and RX electrodes 1105, 1110 may be formed in a dedicated layer separate from the photodiode electrodes. In that example, the TX and RX electrodes 1105, 1110 are used only for capacitive sensing and are not dual purposed to be used both for capacitive sensing and optical sensing (e.g., to couple the PDs to Vcom).

In another embodiment, the TX and RX electrodes 1105, 1110 may be formed on different layers. For example, the TX electrodes 1105 may be formed from the ITO layer coupled to the PDs while the RX electrodes 1110 are formed in a dedicated ITO layer higher up in the sensor stack (or vice versa).

In one embodiment, the input device operates in a first mode (e.g., for finger presence detection or lower resolution sensing) by sensing a transcapacitance between parallel extending groups of the electrodes (e.g., by transmitting and receiving with two or more parallel RX electrodes 1110), and operates in a second mode (e.g., for navigation or higher resolution sensing) by sensing a transcapacitance between perpendicular groups of the electrodes (e.g., by transmitting with the TX electrodes 1105 and receiving with the RX electrodes 1110).

Figure 11B:
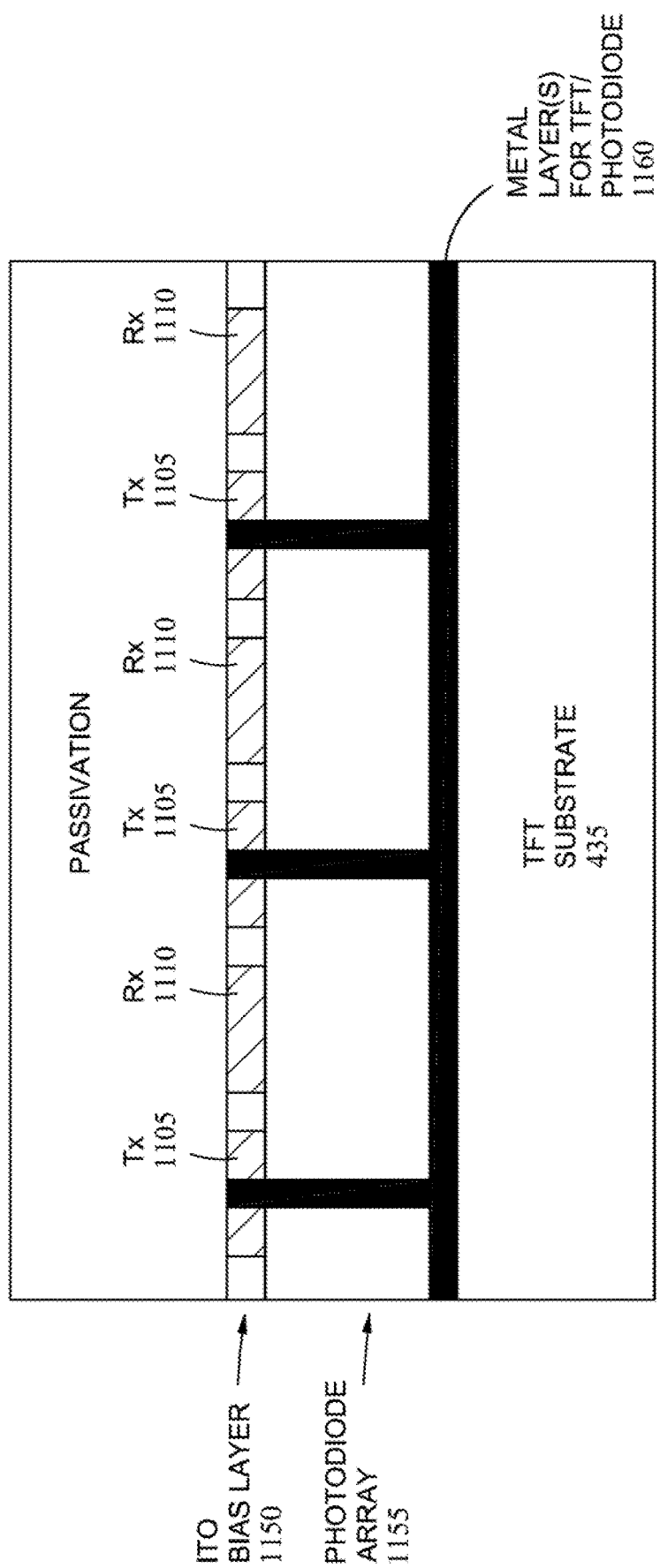
FIG. 11B illustrates a cross section of the structure shown in FIG. 11A, in accordance with an embodiment described herein.

FIG. 11B illustrates a cross section AA' shown in FIG. 11A. As shown, the TX and RX electrodes 1105, 1110 are formed in an ITO bias layer 1150 which is coupled to a photodiode array 1155. Thus, when performing optical sensing, one or more of the TX and RX electrodes 1105, 1110 can be coupled to Vcom, but when performing capacitive sensing, the TX electrodes 1105 are driven using the capacitive sensing signal while the RX electrodes 1110 are used to measure a resulting signal. Further, in some embodiments, only the TX electrodes 1105 may be connected to the photodiode array 1155 (and connected to Vcom during optical sensing), only the RX electrodes 1110 may be connected to the photodiode array 1155 (and connected to Vcom during optical sensing), or both the TX and RX electrodes 1105, 1110 are connected to the photodiode array 1155 (with both connected to Vcom during optical sensing).

Each of the TX electrodes 1105 are coupled by a via to metal routing 1160 which permits the TX electrodes 1105 in a column to be electrically connected to form a single TX electrode 1105 which extends in a direction perpendicular to the RX electrodes 1110. In one embodiment, the metal routing 1160 is an existing metal layer in an optical fingerprint sensor which may be above the TFT substrate 435 and which may be used to route or interconnect one or more TFTs and/or photosensors.

As above, the transcapacitive sensor structures shown in FIGS. 11A and 11B can be used to perform the method shown in FIG. 9 such as the presence detection mode and the navigation mode in an optical fingerprint sensor.

The embodiments and examples set forth herein were presented in order to best explain the embodiments in accordance with the present technology and its particular application and to thereby enable those skilled in the art to make and use the present technology. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

I claim:

1. An input device, comprising:
   a dual optical and capacitance sensor comprising:
   a photosensor;
   a switch electrically coupled between the photosensor and a data line; and
   a capacitive sensing layer comprising an array of sensor electrodes, wherein the photosensor comprises a first node electrically coupled with a first sensor electrode in the array and a second node electrically coupled with the switch; and
   a processing system configured to:
   drive a constant voltage on the first sensor electrode when performing optical sensing; and
   drive an alternating current (AC) signal on the first sensor electrode when performing capacitive sensing.

2. The input device of claim 1, further comprising:
   an analog front end configured to measure capacitive sensing signals when performing capacitive sensing; and
   selection logic configured to couple the first sensor electrode to the analog front end when performing capacitive sensing and couple the first sensor electrode to a constant voltage source when performing optical sensing.

3. The input device of claim 1, wherein the processing system is configured to:
   activate a presence detection mode, wherein the presence detection mode comprises performing capacitive sensing using the first sensor electrode;
   detect an input object when in the presence detection mode; and
   activate an optical detection mode, wherein the optical detection mode comprises performing optical sensing using the photosensor.

4. The input device of claim 3, wherein the presence detection mode is a low power mode and the optical detection mode is a high power mode.

5. The input device of claim 3, wherein the processing system is configured to:
   activate a navigation mode during which the processing system detects more granular information about the input object using capacitive sensing relative to the presence detection mode.

6. The input device of claim 5, wherein the more granular information comprises at least one of a location of the input object in a sensing region established by the capacitive sensing layer and movement of the input object in the sensing region.

7. The input device of claim 1, wherein the sensor electrodes in the array are electrically coupled to respective photosensors, wherein the processing system is configured to drive the sensor electrodes in the array to the constant voltage when performing optical sensing.

8. The input device of claim 7, wherein the processing system is configured to:
   switch from a presence detection mode when performing capacitive sensing to a navigation mode where during the navigation mode the AC signal is driven on the sensor electrodes in the array; and
   switch from the presence detection mode to performing optical sensing during which the sensor electrodes in the array are driven to the constant voltage.

9. The input device of claim 1, wherein the array of sensor electrodes is arranged on a common layer to form a rectangular array that comprises a plurality of rows and columns, wherein the sensor electrodes in the array are electrically coupled to respective photosensors in the dual optical and capacitance sensor.

10. The input device of claim 1, wherein the photosensor is a photodiode and the switch is electrically coupled to a first surface of the photodiode that is opposite a second surface of the photodiode which is electrically coupled to the first sensor electrode.

11. The input device of claim 1, further comprising a fingerprint sensor comprising the dual optical and capacitance sensor, wherein the processing system is configured to detect a presence of a finger when performing capacitive sensing and detect a fingerprint of the finger when performing optical sensing.

12. The input device of claim 1, wherein the processing system is configured to drive the AC signal on gate lines.

13. The input device of claim 1, wherein the first sensor electrode comprises an optical transparent material, wherein the first sensor electrode covers the photosensor such that the first sensor electrode is disposed between the photosensor and a capacitive sensing surface.

14. A processing system, comprising:
a sensor circuit configured to:
drive a constant voltage onto a photosensor using a sensor electrode when performing optical sensing; and
drive an AC signal on the sensor electrode when performing capacitive sensing,
wherein the sensor circuit comprises an analog front end configured to detect an input object using the AC signal when performing capacitive sensing.

15. The processing system of claim 14, further comprising:
selection logic configured to couple the sensor electrode to the analog front end when performing capacitive sensing and couple the sensor electrode to a constant voltage source when performing optical sensing.

16. The processing system of claim 14, wherein the sensor circuit is configured to:
activate a presence detection mode, wherein the presence detection mode comprises performing capacitive sensing using the sensor electrode;
detect the input object when in the presence detection mode; and
the processing system further comprising an optical analog front end configured to activate an optical detection mode, wherein the optical detection mode comprises performing optical sensing using the photosensor.

17. The processing system of claim 16, wherein the presence detection mode is a low power mode and the optical detection mode is a high power mode.

18. The processing system of claim 16, wherein the sensor circuit is configured to:
activate a navigation mode during which the processing system detects more granular information about the input object using capacitive sensing relative to the presence detection mode.

19. A method, comprising:
driving a constant voltage onto a photosensor using a sensor electrode when performing optical sensing;
measuring a fingerprint when performing optical sensing using the photosensor; and
driving an AC signal on the sensor electrode when performing capacitive sensing.

20. The method of claim 19, further comprising:
activating a presence detection mode, wherein the presence detection mode comprises performing capacitive sensing using the sensor electrode;
detecting an input object when in the presence detection mode; and
activating an optical detection mode, wherein the optical detection mode comprises performing optical sensing using the photosensor.

* * * * *